United States Patent
Roy et al.

(10) Patent No.: US 11,797,500 B2
(45) Date of Patent: *Oct. 24, 2023

(54) ENSURING DATABASE INTEGRITY USING A DATA FLOW IN A GRAPH, SUCH AS FOR USE BY A WIRELESS TELECOMMUNICATIONS SERVICE PROVIDER

(71) Applicant: T-Mobile USA, Inc., Bellevue, WA (US)

(72) Inventors: Debadrita Roy, Bothell, WA (US); Kevin Pearson, Loganville, GA (US); Venkat Mondreti, Peachtree Corners, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,445

(22) Filed: Aug. 26, 2022

(65) Prior Publication Data

US 2022/0414073 A1 Dec. 29, 2022

Related U.S. Application Data

(63) Continuation of application No. 17/343,140, filed on Jun. 9, 2021, now Pat. No. 11,461,297.

(51) Int. Cl.
*G06F 16/21* (2019.01)
*H04W 24/02* (2009.01)
(Continued)

(52) U.S. Cl.
CPC ............ *G06F 16/215* (2019.01); *G06F 16/26* (2019.01); *H04L 67/306* (2013.01); *H04W 24/02* (2013.01)

(58) Field of Classification Search
CPC .... G06F 16/215; G06F 16/26; G06F 16/2365; G06F 16/9024; G06F 16/9035;
(Continued)

(56) References Cited

U.S. PATENT DOCUMENTS 6,378,066 B1 4/2002 Lewis
7,624,448 B2 11/2009 Coffman
(Continued)

FOREIGN PATENT DOCUMENTS

EP 1026583 A2 8/2000
EP 1026585 A2 8/2000
(Continued)

*Primary Examiner* — Alford W Kindred
*Assistant Examiner* — Cecile H Vo
(74) *Attorney, Agent, or Firm* — Perkins Coie LLP

(57) ABSTRACT

The system ensures database validity by obtaining a data structure representing data processing blocks and a data flow among the data processing blocks. A first data processing block includes a first data input and the second data processing block includes a second data output. The system obtains controls associated with the data structure, where a first control corresponds to the first data output, and a second control corresponds to the second data input. The system obtains data to be processed by the first data processing block, processes the data through the first data processing block, and executes the first control based on the processed data. Based on the execution, the system determines whether the processed data satisfies the first control. If the processed data does not satisfy the first control, the system generates an alert indicating a problem with the output data validity.

20 Claims, 8 Drawing Sheets

(51) Int. Cl.
   *G06F 16/215* (2019.01)
   *H04L 67/306* (2022.01)
   *G06F 16/26* (2019.01)
   *H04L 67/30* (2022.01)
(58) Field of Classification Search
   CPC ..... G06F 16/903; H04L 67/306; H04L 67/30;
         H04L 67/535; H04W 24/02; G06Q
         10/063; G06Q 30/04; G06Q 40/03; G06Q
         40/12; G06Q 50/32; G06Q 10/06; E21B
         41/0092
   See application file for complete search history.

(56) References Cited

U.S. PATENT DOCUMENTS

| | | |
|---|---|---|
| 7,969,434 B2 | 6/2011 | Peterson et al. |
| 8,266,697 B2 | 9/2012 | Coffman |
| 8,458,684 B2 | 6/2013 | Eichenberger et al. |
| 8,601,457 B1 | 12/2013 | Han |
| 8,825,695 B2 | 9/2014 | Studer et al. |
| 8,930,337 B2 | 1/2015 | Studer et al. |
| 9,009,690 B1 | 4/2015 | Orofino et al. |
| 9,015,646 B2 | 4/2015 | Alfieri |
| 9,846,732 B2 | 12/2017 | Farver et al. |
| 9,888,007 B2 | 2/2018 | Caldera et al. |
| 9,977,659 B2 | 5/2018 | Larson et al. |
| 9,984,067 B2 | 5/2018 | Visel |
| 10,044,548 B2 | 8/2018 | Glines et al. |
| 10,356,099 B2 | 7/2019 | Caldera et al. |
| 10,431,327 B2 | 10/2019 | Wang et al. |
| 10,454,889 B2 | 10/2019 | Huang |
| 10,579,678 B2 | 3/2020 | Vogler et al. |
| 10,599,775 B2 | 3/2020 | Visel |
| 10,691,751 B2 | 6/2020 | Atlas et al. |
| 10,769,521 B1 | 9/2020 | Yu et al. |
| 10,817,495 B2 | 10/2020 | Dickie |
| 10,977,363 B2 | 4/2021 | Leitner et al. |
| 11,039,305 B1* | 6/2021 | Sikes .................... H04W 8/183 |
| 2007/0209074 A1 | 9/2007 | Coffman |
| 2009/0284523 A1 | 11/2009 | Peterson et al. |
| 2011/0047359 A1 | 2/2011 | Eichenberger et al. |
| 2011/0066602 A1 | 3/2011 | Studer et al. |
| 2011/0307897 A1 | 12/2011 | Atterbury et al. |
| 2012/0227047 A1 | 9/2012 | Aharoni et al. |
| 2013/0212234 A1 | 8/2013 | Bartlett et al. |
| 2014/0208334 A1* | 7/2014 | Inoue ................ G06F 16/90344 719/318 |
| 2014/0310673 A1 | 10/2014 | Alfieri |
| 2014/0379879 A1 | 12/2014 | Bartlett et al. |
| 2015/0066163 A1 | 3/2015 | Sunderam |
| 2017/0046481 A1 | 2/2017 | Wang et al. |
| 2017/0331828 A1 | 11/2017 | Caldera et al. |
| 2017/0364552 A1* | 12/2017 | Pattanaik ........... G06F 16/2365 |
| 2018/0217982 A1 | 8/2018 | Visel |
| 2018/0285401 A1 | 10/2018 | Dickie |
| 2019/0034558 A1 | 1/2019 | Leeman-munk et al. |
| 2019/0138542 A1 | 5/2019 | Van Beest et al. |
| 2019/0386969 A1* | 12/2019 | Verzun ................. G06F 21/606 |
| 2020/0117731 A1* | 4/2020 | Deb ..................... G06F 16/215 |
| 2020/0293916 A1 | 9/2020 | Li |
| 2020/0296007 A1 | 9/2020 | Finn et al. |
| 2020/0356599 A1 | 11/2020 | Xia et al. |
| 2020/0387547 A1 | 12/2020 | Yoshitake et al. |
| 2021/0072709 A1 | 3/2021 | Oliver et al. |
| 2021/0104316 A1 | 4/2021 | Yamamoto et al. |
| 2021/0141674 A1* | 5/2021 | Ravindran ......... G06F 16/2471 |

FOREIGN PATENT DOCUMENTS

| | | |
|---|---|---|
| EP | 2377080 A1 | 10/2011 |
| EP | 2478433 A1 | 7/2012 |
| EP | 3039595 A1 | 7/2016 |
| EP | 3189422 A1 | 7/2017 |
| EP | 3465509 A1 | 4/2019 |
| WO | 2008021585 A2 | 2/2008 |
| WO | 2009094672 A2 | 7/2009 |
| WO | 2011035039 A1 | 3/2011 |
| WO | 2011159759 A1 | 12/2011 |
| WO | 2015031053 A1 | 3/2015 |
| WO | 2018183676 A1 | 10/2018 |

* cited by examiner

ENSURING DATABASE INTEGRITY USING A DATA FLOW IN A GRAPH, SUCH AS FOR USE BY A WIRELESS TELECOMMUNICATIONS SERVICE PROVIDER

CROSS-REFERENCE TO RELATED APPLICATIONS

This application is a continuation of U.S. patent application Ser. No. 17/343,140 filed Jun. 9, 2021, now issued as U.S. Pat. No. 11,461,297, which is hereby incorporated by reference in its entirety.

BACKGROUND

Data integrity (validity) refers to the accuracy and consistency of data over its lifecycle. Data integrity ensures recoverability and searchability, traceability (to origin), and connectivity. Data validity can be compromised in a variety of ways, such as: human error; transfer errors, including unintended alterations or data compromise during transfer from one device to another; bugs, viruses/malware, hacking, and other cyber threats; compromised hardware, such as a device or disk crash; physical compromise to devices. A solution is needed to protect data validity to increase system stability and performance while improving data reusability and maintainability.

BRIEF DESCRIPTION OF THE DRAWINGS

Detailed descriptions of implementations of the present invention will be described and explained through the use of the accompanying drawings.

Figure 1:
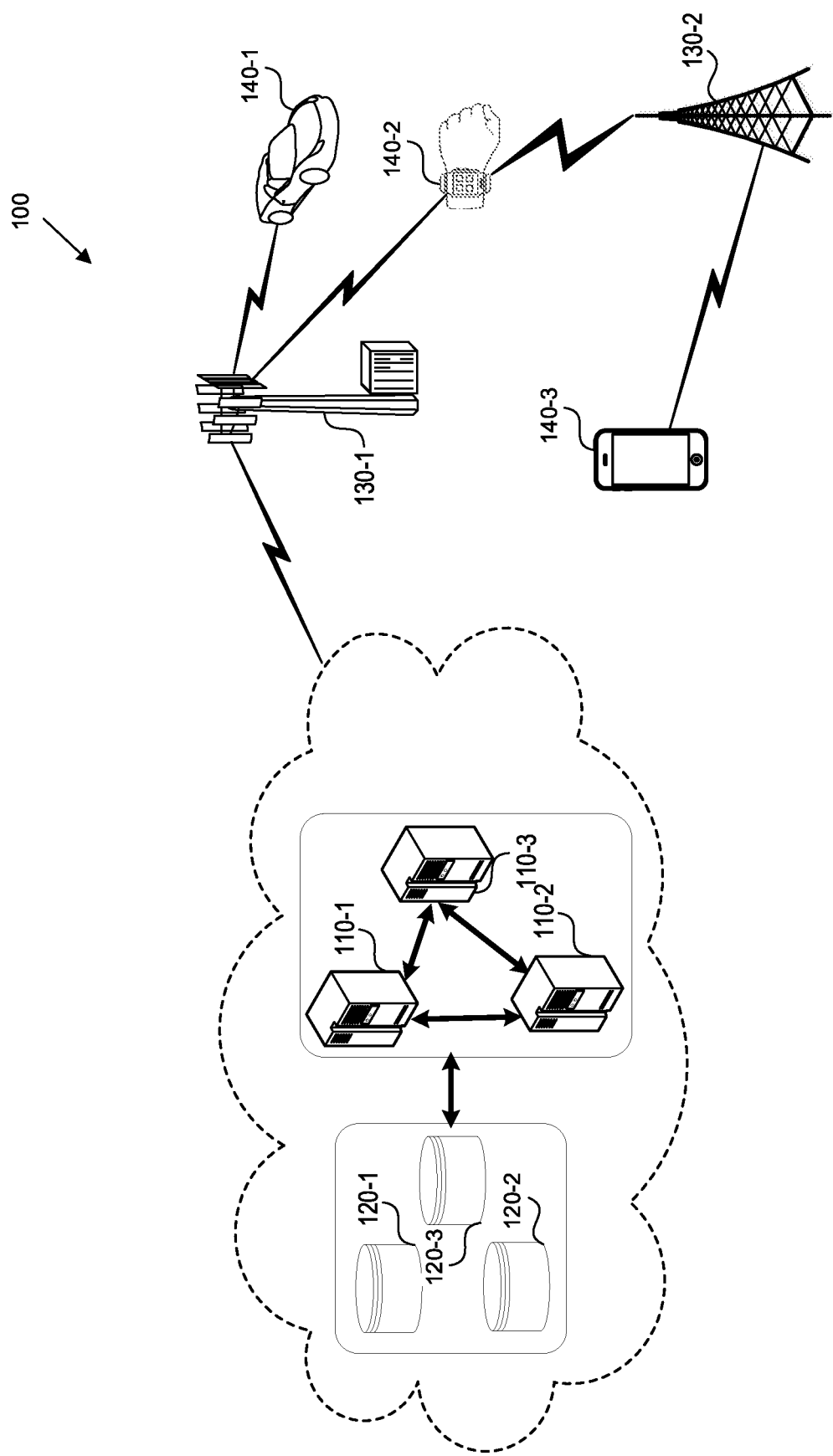
FIG. 1 shows a wireless telecommunication network within which the disclosed technology can operate.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to ensure database validity using a graph including multiple nodes, one or more edges connecting the nodes and controls associated with inputs and outputs to the nodes. For example, two nodes, node A and node B, represent data processing blocks configured to modify data or generate data, such as two separate databases with associated servers. Node A includes a data output A, and node B includes data input B. An edge represents a flow of data between node A and node B, for example between the data output A and the data input B. The system can obtain multiple controls associated with the graph, where a control A checks data output A, and control B checks data input B. The control can be a computer program configured to obtain incoming data and expected values associated with the incoming data, and also check that the incoming data conforms to the expected values. In addition, the control can check for compliance with various standards, such as expected amount of data, data content, threshold, proper format. For example, the control can ensure that the files contain the expected number of records, such as 100,000 records.

The system can obtain data to be processed by node A, process the data through node A to obtain output data, and execute the first control based on the output data. Based on the execution of control A, the system can determine whether the output data satisfies control A. Upon determining that the output data does not satisfy the control, the system can generate an alert indicating a problem with the output data validity. Upon determining that the output data satisfies control A, the system can send the output data to the second node.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Ensuring Database Integrity Using a Data Flow in a Graph

FIG. 1 shows a wireless telecommunication network 100 ("network 100") within which the disclosed technology can operate. The network 100 includes multiple servers 110-1 through 110-3, databases 120-1 through 120-3, base stations 130-1 through 130-2. The network 100 can provide cellular service to a user equipment (UE) 140-1 through 140-3.

The servers 110-1 through 110-3 provide support for the network 100 that provides 4G/5G connectivity, sales and service for 5G devices, such as UEs 140-1 through 140-3. The databases 120-1 through 120-3 can store data about the network 100, usage of the network 100, and/or the UEs 140-1 through 140-3. The data can include leases, promotions, number of devices sold, technical problems reported, resolution of technical problems reported, user/subscriber data, invoicing data, account/inventory data, NR data, loan/credit data, maintenance/service data, customer service/support data, etc.

Figure 2:
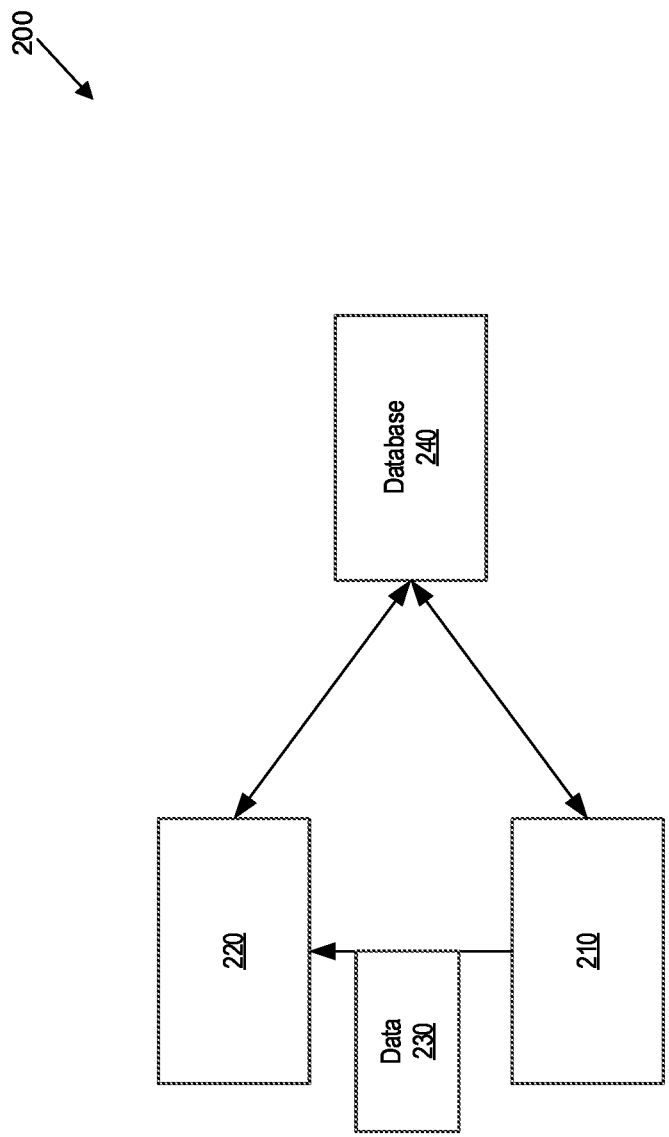
FIG. 2 shows an overview of the system.

FIG. 2 shows an overview of the system 200. Multiple system components 210, 220 interact with each other by passing data 230. The data 230 can be stored in the database 240. The data 230 needs to be compatible with the system 220 receiving the data. To ensure that the data 230 is in the format that the receiving system 220 expects, and that the data contains the expected information, the system 200 implements a data structure, such as a graph, describing dependencies between system components 210, 220, and a set of controls verifying the validity of the data 230 and the database 240.

Figure 3:
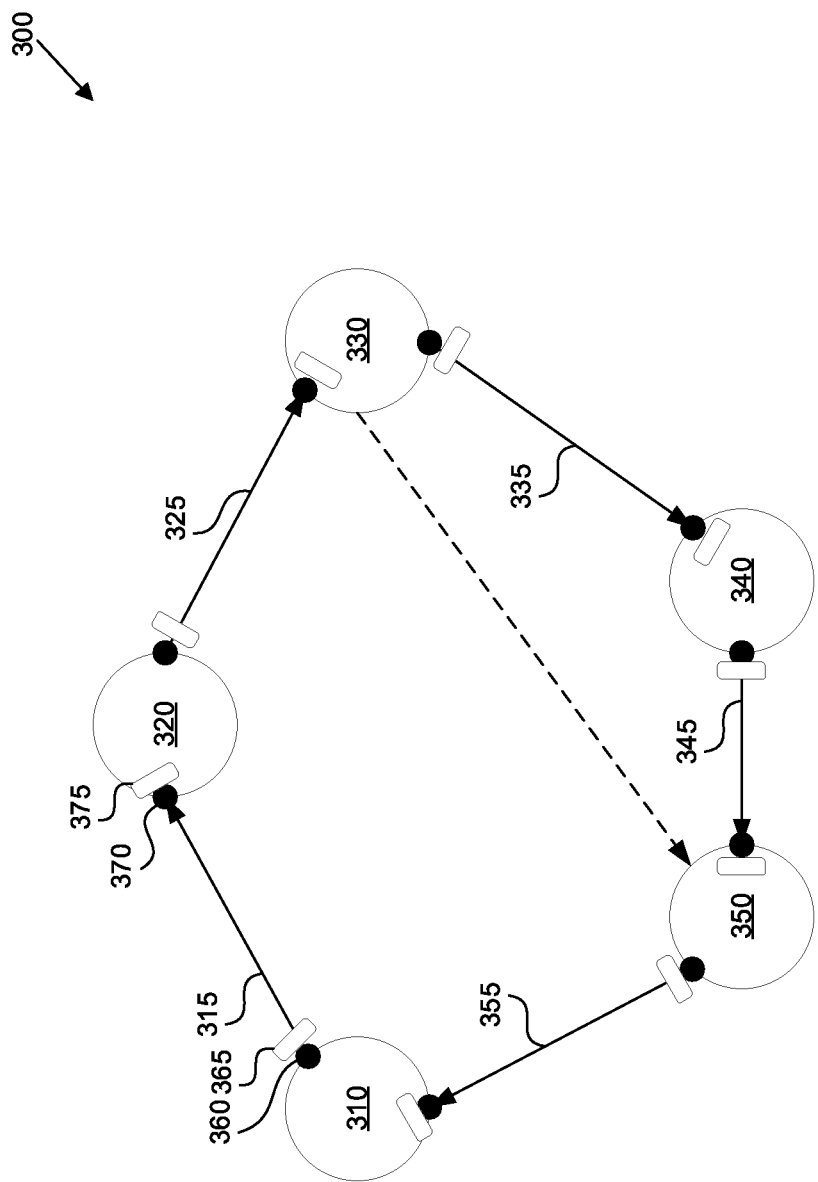
FIG. 3 shows a graph used to determine data validity, according to one embodiment.

FIG. 3 shows a graph used to determine data validity, according to one embodiment. The graph 300 represents dependencies between various system components (e.g., data processing blocks or nodes) 310, 320, 330, 340, 350. The edges 315, 325, 335, 345, 355 represents the flow of data between the nodes 310, 320, 330, 340, 350. The graph 300 can have multiple components such as two components or thousands of components. The graph 300 can be hierarchical, where each component 310, 320, 330, 340, 350 contains a sub graph. The graph 300 can represent dependencies in a system for providing mobile device loans to a user, for tracking a number of 5G-capable devices sold, for tracking technical problems with a wireless telecommunication network 100 in FIG. 1, etc.

In one embodiment, when the graph 300 represents a loan for purchase of a 5G device, the node 310 can be a user facing front-end where a user can request a loan. The front-end can include a web service, a retail store, or a phone system, such as an interactive voice response (IVR) system.

The node 320 neighboring the node 310 can be a credit check node. The credit check node 320 can determine the loan amount, the term, the monthly payment, any credit history, any existing user loans, and whether the user qualifies for the loan.

The node 330 neighboring the node 320 can be a signature node. The signature node 330 can determine whether the user has signed a request for the loan because without the signature, the request for the loan is not valid. For example, the node 330 can check whether the document contains the signature. The document can be a link, such as a DocuSign link, and the node 330 can check whether the DocuSign link has been signed.

The node 340 neighboring the node 330 can be a billing node. The billing node 340 can determine a period at which to bill the user who has acquired the 5G device and is repaying 5G device in installments. For example, the user can purchase the 5G device and repay it in installments over 24 months.

The node 350 neighboring the node 340 can be an accounting node. The node 350 can also neighbor the node 310. The accounting node 350 can track the outstanding balance from the billing node 340 and the incoming payments from the node 310. The accounting node 350 can process and confirm at a predetermined period, such as every month, that the outstanding balance matches the incoming payments.

If there is a discrepancy between the outstanding balance provided by the node 340, and the incoming payments from the node 310, the system 200 in FIG. 2 can generate an alert about the discrepancy. The system 200 can send the alert to an automated system, such as an artificial intelligence (AI)/machine learning (ML) model, to determine the cause of the alert. The automated system can retrieve the data associated with the nodes 310-350 from the database 240 in FIG. 2 and determine where the discrepancy is coming from. For example, the user could have returned the 5G device after 14 days, and the system 200 needs to close the loan. However, the information about the return of the 5G device may not have propagated to the accounting node 350. Consequently, the automated system can update the data in the database 240 associated with the billing node 340 and the accounting node 350 to reflect the closing of the loan.

In another embodiment, the graph 300 can track a number of users that have applied for a loan. For example, the nodes 310, 320, 330 can record into the database 240 that 1,000 users obtained a loan. By the time the information propagates to the accounting node 350, the accounting node is aware of 800 users that have taken the loan. When the node 310 sends a payment for 1,000 loans, and the accounting node 350 is only expecting a payment for 800 customers, the system 200 can generate an alert about the discrepancy. Further, the system 200 can determine what happened to the 200 users by tracing the flow of data along the edges 315, 325, 335, 345, 355 of the graph 300. For example, some loans may have been closed, or some loans may have been mistakenly not communicated to the accounting node 350.

The system 200 in FIG. 2 can proactively check the validity of the database 240 in FIG. 2 at a predetermined period of time, such as every day, every week, every month. For example, the system can request each node 310, 320, 330, 340, 350, to produce an output 360 (only one labeled for brevity) and check that the corresponding input 370 (only one labeled for brevity) matches the output 360 using controls 365, 375, as explained in FIG. 5. By the matching output 360 to the corresponding input 370, and detecting discrepancies (e.g., anomalies) the system 200 can resolve the discrepancies before they arise in production and affect users.

In other embodiments, the graph 300, in addition to ensuring database validity for the state of loans, can ensure database validity for various other data such as leases, promotions, number of devices sold, resolution of technical problems reported, etc. For example, the node 310 can record a number of technical problems reported. The node 320 can prioritize the reported technical problems on a scale from 1 to 3, where priority 1 indicates an urgent priority, and priority 3 indicates a low priority problem. The node 330 can track the updates to the technical problems. The node 350 can be a neighbor of the node 330 and can track the resolution status of the technical problems. If 20 technical problems reported to node 310, but only 18 have been resolved at node 350 after a predetermined period of time, such as one month, the system 200 can determine what happened to the two unresolved issues. For example, the system 200 can determine that the user has withdrawn the report, or the system can determine that at least one of the two problems has not been resolved and can escalate the priority of the problem.

The system 200 can modify the graph 300 based on user actions. For example, the user can decide that the user does not want the loan anymore, that the user wants to pay the loan off at an accelerated timeline, or that the reported issue is not a technical issue. Consequently, the system can create a different graph to reflect a flow of data associated with the user. The different graph can reflect that the user has made a direct payment, and did not take a loan, or the different graph can reflect that the user has specified the priority of the reported technical problem, instead of waiting for the system to determine the priority. Based on the user input or user profile, the system 200 can determine the appropriate graph to assign to the user, and consequently, the appropriate system of controls, as described below, to apply to the user data to determine that the data is valid.

Figure 4:
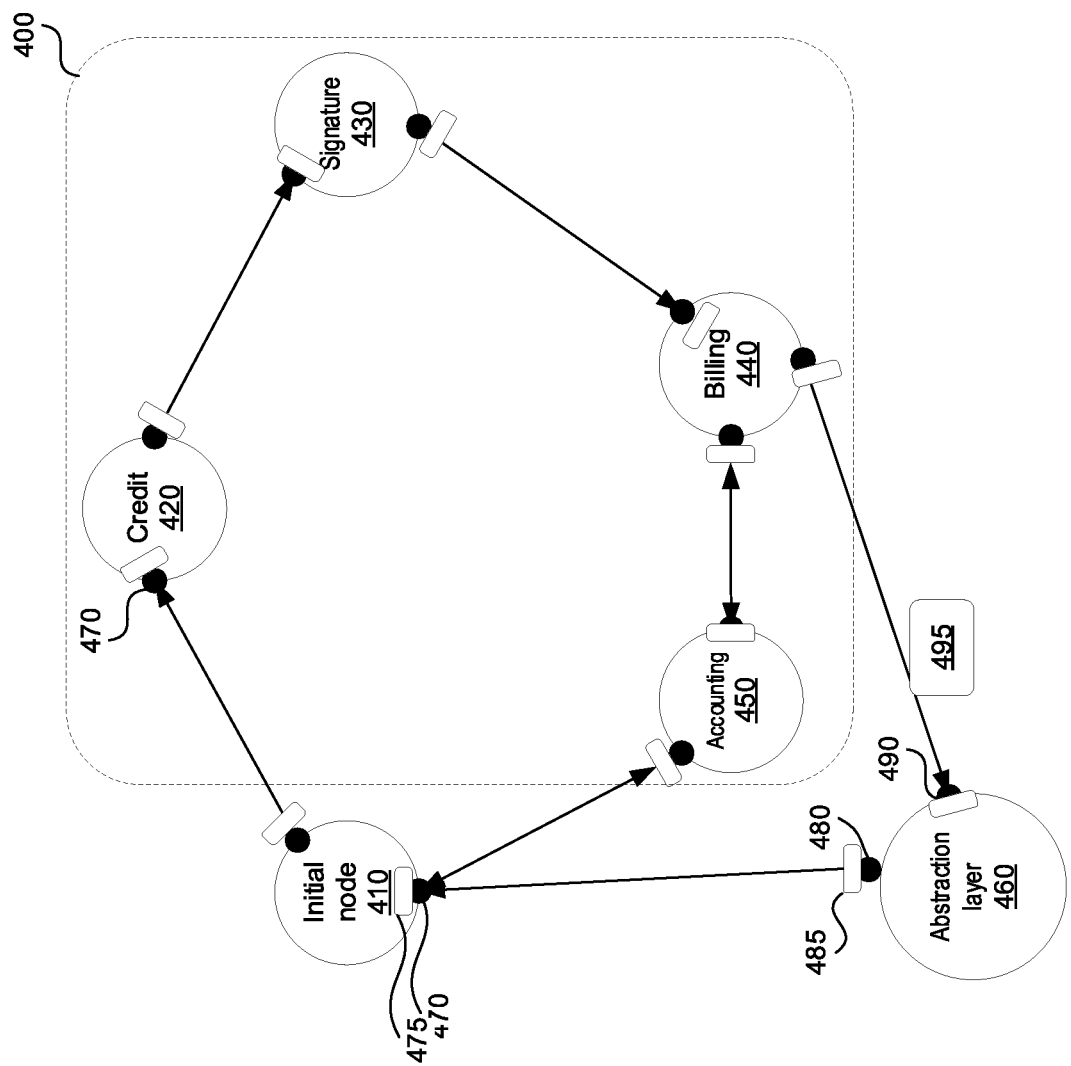
FIG. 4 shows a graph used to determine data validity, according to another embodiment.

FIG. 4 shows a graph used to determine data validity, according to another embodiment. The initial node 410 can be the user facing front end such as the Web, a retail store, or a phone system. The node 420 neighboring the node 410 can be a credit check node, the node 430 neighboring the node 420 can be a signature node, the node 440 neighboring the node 430 can be a billing node, and the node 450 neighboring the node 440 can be an accounting node, as described in this application.

The initial node 410 can be a third-party hosted system that does not know how to interface with the internal subsystem 400 including the nodes 420, 430, 440, 450, 460. The initial node 410 may need to communicate with the billing node 440. The third-party hosted system, due to security reasons, cannot interact directly with the internal subsystem 400, which can be implemented in the cloud. Consequently, the initial node 410 does not know the proper formatting of the information such as files or streaming data to send to the billing node 440. For example, the third-party system can refer to customer by an alphanumeric string, such as "5678" customer, but inside the internal system 400, the user is labeled as "Jane Hathaway." In another example, the third-party system can have the customers phone number as "5xyz56" and the internal system can have customers actual phone number.

To facilitate communication between the initial node 410, and the billing node 440, the system 200 creates an additional node, the abstraction layer node 460. The abstraction layer node 460 can contain the necessary mapping of data between the initial node 410 and the internal subsystem 400. In addition, the system 200 can check that the output 470 of the initial node 410 matches the corresponding input 480 of the abstraction layer node 460 using controls 475, 485, respectively, as described in FIG. 5.

Figure 5:
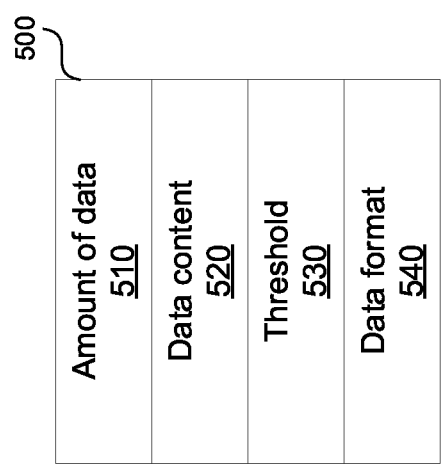
FIG. 5 shows controls used in ensuring data validity flowing through the graph.

FIG. 5 shows controls used in ensuring data validity flowing through the graph. The control 500 can be a computer program configured to obtain incoming data 230 in FIG. 2 and expected values associated with the incoming data, and also check that the incoming data conforms to the expected values. The control 500 can be the output or input control 365, 375 in FIG. 3 or 475, 485, 490 in FIG. 4. The controls 365, 375, 475, 485, 490 can vary based on the node with which they are associated, and based on checks they perform and the expected values they contain. The control 500 can check for compliance with various standards, such as expected amount of data 510, data content 520, threshold 530, proper format 540. The expected amount of data 510 can be represented in the number of files and/or memory size of the received data such as megabytes. The data content 520 can indicate values expected to be found in the file. The threshold 530 can specify a tolerance for the amount of data 510 and/or data content 520. For example, the threshold 530 can have a value of 1% to 2%, which indicates that if the actual amount of data flowing to a receiving node is within 1% to 2% of the expected amount of data 510, the control 500 considers the expected amount of data 510 standard to be satisfied. The proper format 540 control can ensure that the data is in the proper file format, such as that the data is streaming, real-time data formatted according to the proper protocol.

For example, the control 500 can be the control 490 in FIG. 4. The amount of data 510 can ensure that the receiving node, for example, node 440 in FIG. 4, receives the expected number of files, such as 15 files. The data content 520 can ensure that the files contain the expected number of records, such as 100,000 records. The control 500 can request that the billing node 440 send a receipt to the node 460 confirming that the expected amount of data was received. If the expected amount of data was not received, the control 500 can request the billing node 440 to send an error. The billing node can send the errors report in the form of file which contains error code and description. Few examples of the errors which the control can detect are invalid/inactive customer information, backdated or duplicate billing transactions. The control 500 can determine the error against the threshold to determine whether the error fall within the tolerance. If the error falls within the tolerance, the control 500 can determine that the sent data 495 is valid. If the error is not within the tolerance, the control 500 can send an alert, and the system 200 can determine the cause of the error using an automated system, as described in this application.

In another example, the control 500 can be the control 475 in FIG. 4. The data content 520 of the control 500 can ensure that the dollar amount of the loans is the same in the initial node 410 in FIG. 4, and in the accounting node 450 in FIG. 4. For example, the initial node may expect $1.8 billion in loans, while the accounting node is requesting $2 billion in loans. The control 500 can detect the discrepancy and send an alert. The discrepancy can occur because some of the loans were completed, or canceled, and the system 200 can determine the cause of the discrepancy.

The control 500 can run at predetermined frequencies, such as hourly, daily, weekly, monthly. Sometimes, the detected discrepancy can be because the incoming data is real-time data, and that the control 500 does not have access to the up-to-date data due to a delay in the real-time data. Occasionally, the control 500 can run at two different frequencies. An error detected when the control runs at a higher frequency, such as the daily frequency, can be resolved when the control 500 runs at the end of the month.

In a third example, the data content 520 of the control 500 can ensure that the data 495 is delivered on a particular date. For example, the accounting node 450 may need to deliver invoices to users on particular dates, where the particular date is different for each user, such as the 13th, the 14th, the 15th of the month and so on. If the delivery is delayed, the invoice can be invalid, and the accounting node 450 can have only a two-day window to process these charges. In that case, the control 500 can ensure that the charges are received by the billing node 440 every day, that the charges received by the billing node 440 are due within two days of the date received, and that all the charges due are received by the billing node 440. If there is an error, the system 200 can determine whether the error is valid and the user has canceled the loan, or whether there is an error in the data 230 in FIG. 2 and/or the database 240 in FIG. 2.

Figure 6:
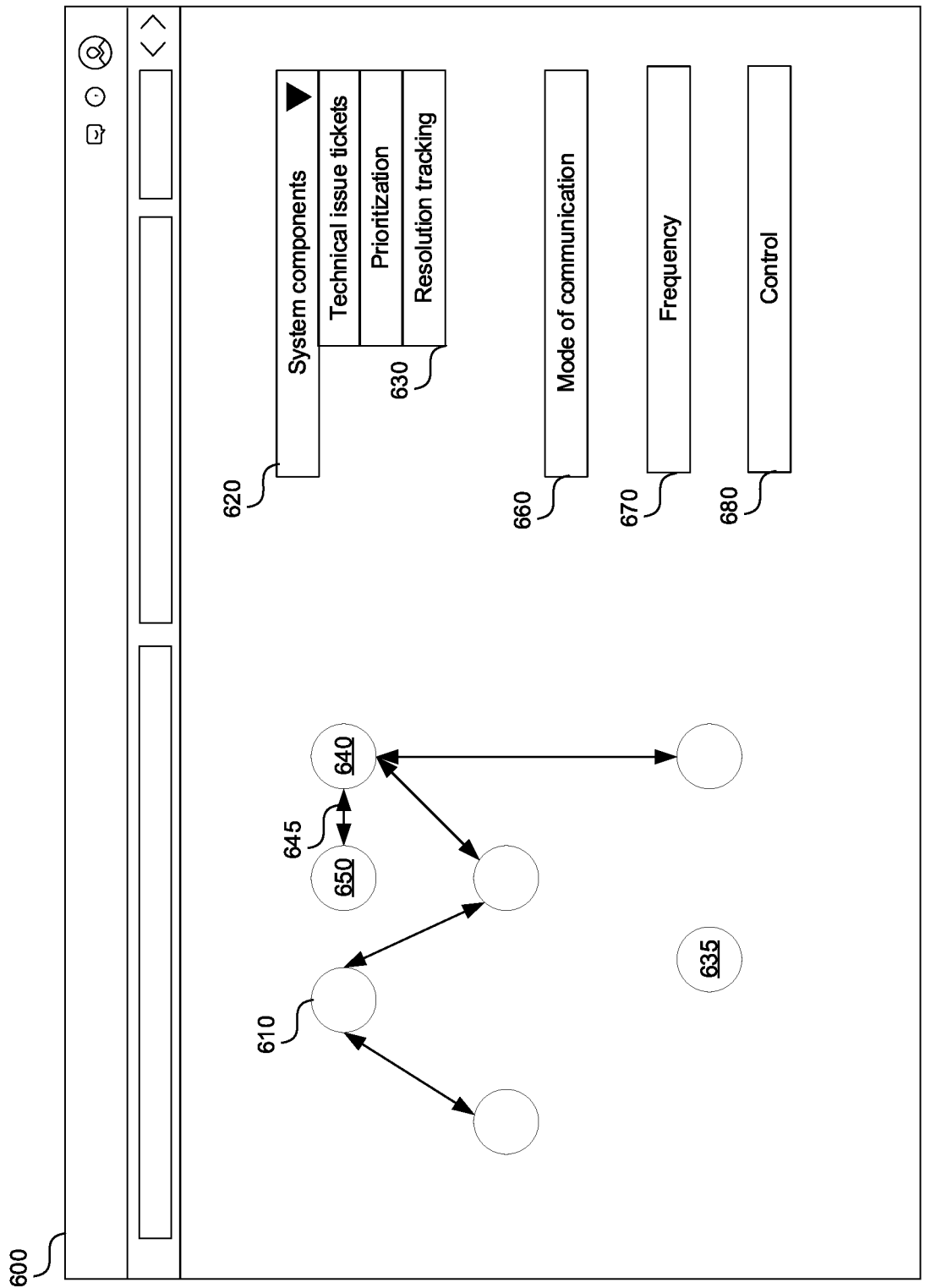
FIG. 6 shows a graphical user interface to create a graph.

FIG. 6 shows a graphical user interface to create a graph. The graphical user interface (GUI) 600 can enable the user to create the graph 610 representing dependencies between various system components. The user interface element 620 can present the user with the option to select the needed system components. User interface element 620 can be a drop-down menu, and/or can be searchable. When the user selects the system component 630 (only one labeled for brevity), the GUI 600 can instantiate the corresponding node 635 in the graph 610. The GUI 600 can enable the user to establish connections 645 between the nodes 635, 640, 650 (only three labeled for brevity).

The user interface element 660 can enable the user to specify the mode of communication, such as a batch system using files, or a real-time communication using message passing. For example, HTTPs protocol methods like POST, GET, PUT and DELETE can be used for real-time communications. In another example, when a same message needs to be passed to multiple nodes, a messaging interface will be used which can distribute/exchange the message to multiple nodes based on the rules which are defined.

The user interface element 670 can enable the user to specify a frequency of communication. For example, the frequency can indicate how frequently each node communicates with its neighbor.

The user interface element 680 can enable the user to specify a control in natural language, such as English. And the system 200 in FIG. 2 can perform natural language processing to translate the natural language input into codes.

The user interface element 680 can have a drop-down menu of the most frequently used controls from which the user can make a selection. The user interface element 680 can have a preset terminology and can allow the user to type in specific variables, such as the amount of the loan. The user interface element 680 can also receive a voice or a text input from the user specifying the control.

For example, the natural language input for a control can state, "each loan of 24 months is captured, signed, and billed monthly." Consequently, the system can process the natural language input into a control having data content 520 in FIG. 5 to ensure monthly billing. The same or different control having threshold 530 in FIG. 5 can ensure that the discrepancy between the number of 24-month loans expected and 24-month loans billed is 0%, because the control states "each loan of 24 months is captured." The user can also specify in the user interface element 680 the billing date, such as the 15th day of each month, every Tuesday of every week, etc.

The system 200 can determine how frequently to run the tests of the graph 610 using the user input. For example, the user can specify the frequency at which the nodes in the graph 610 need to communicate with each other and/or produce an output, such as every month. However, the system 200 can decide to more frequently test the flow of data through the graph 610 by executing the graph 610, including the nodes and the controls, based on new user input. For example, the system can run the tests of the data flow and generate any alerts if the controls detect discrepancy between received data and expected data at a predetermined frequency higher than the user-specified frequency, such as weekly, daily, or hourly.

Figure 7:
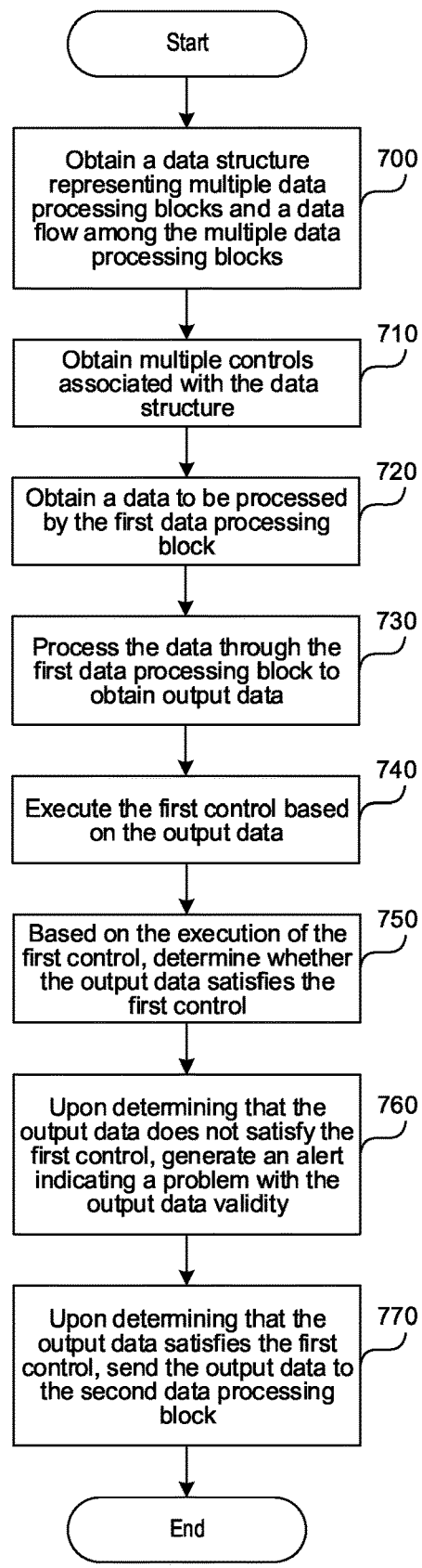
FIG. 7 is a flowchart of a method to ensure database validity using a graph.

FIG. 7 is a flowchart of a method to ensure database validity using a graph. In block 700, a hardware or software processor executing instructions described in this application can obtain a data structure representing multiple data processing blocks and a data flow among the multiple data processing blocks. The data can include, for example, a number of 5G capable devices operating on the wireless telecommunication network. The data structure can be a graph including multiple nodes and one or more edges, where a first node and a second node among the multiple nodes represent data processing blocks configured to modify data or generate data, and an edge represents a flow of data between the first node and the second node. The first node can include a first data input and a first data output, and the second node includes a second data input and a second data output.

In block 710, the processor can obtain multiple controls associated with the data structure. The control can be a computer program configured to obtain incoming data and expected values associated with the incoming data, and check that the incoming data conforms to the expected values. A first control among the multiple controls associated with the first data output can check that the first data output conforms to the expected output values. A second control among the multiple controls associated with the second data input can check that the second data input conforms to the expected input values.

In block 720, the processor can obtain data to be processed by the first data processing block, for example, node. In block 730, the processor can process the data through the first data processing block to obtain output data. In block 740, the processor can execute the first control using the output data as input. In block 750, based on the execution of the first control, the processor can determine whether the output data satisfies the first control.

In block 760, upon determining that the output data does not satisfy the first control, the processor can generate an alert indicating a problem with the output data validity. The processor can send the alert to an automated system such as an AI/ML system that can determine the cause of the alert and/or solve the issue. The processor can obtain from a second database multiple alerts and multiple solutions associated with the multiple alerts. The processor can match the alert to an alert contained in the second database, where among all the alerts contained in the second database, the current alert is the most similar to the alert contained in the second database. Based on the match, the processor can retrieve a solution associated with the alert contained in the second database. The processor can suggest the solution to resolve the alert. In some embodiments, the processor can automatically implement the solution to resolve the alert.

In block 770, upon determining that the output data satisfies the first control, the processor can send the output data to the second data processing block.

The processor can test the database validity at a higher frequency or before the graph needs to generate a report. The processor can obtain a frequency at which to test the database validity. The frequency can be user-specified or can be determined by the system 200 in FIG. 2. Based on the obtained frequency, the processor can obtain data associated with a node among the multiple nodes. For example, the processor can obtain the data from the database 240 in FIG. 2. Based on the data, the processor can execute a portion of the graph containing the node, or the whole graph, by executing a control associated with the node and the data to detect whether the data is valid. Upon determining that the data is not valid, the processor can generate a second alert indicating a problem with the data validity.

To determine data validity, the processor can check whether the data matches the expected value within a predetermined threshold. The processor can obtain a threshold associated with the first control, where the first control includes an expected value associated with the output data. The processor can determine whether the value associated with the output data meets the expected value within the threshold. Upon determining that the value associated with the output data does not meet the expected value within the threshold, the processor can generate the alert.

The processor can provide a user interface for a user to specify the graph, the mode of communication between the nodes in the graph, and frequency. The user interface can be a graphical user interface, an audio interface, a virtual reality interface, etc. Based on the indication of the graph, the indication of the mode of communication, and the frequency, the processor can automatically create the multiple controls associated with the graph and a frequency at which to test a portion, or all, of the graph.

The processor can automatically assign a graph to the user based on a user profile. The processor can obtain a user profile, and multiple graphs corresponding to multiple user profiles. Based on the user profile and the multiple user profiles, the processor can determine a first graph among the multiple graphs matching the user profile and assign the first graph to the user. Finally, the processor can add the user profile to a database associated with the first graph.

Computer System

Figure 8:
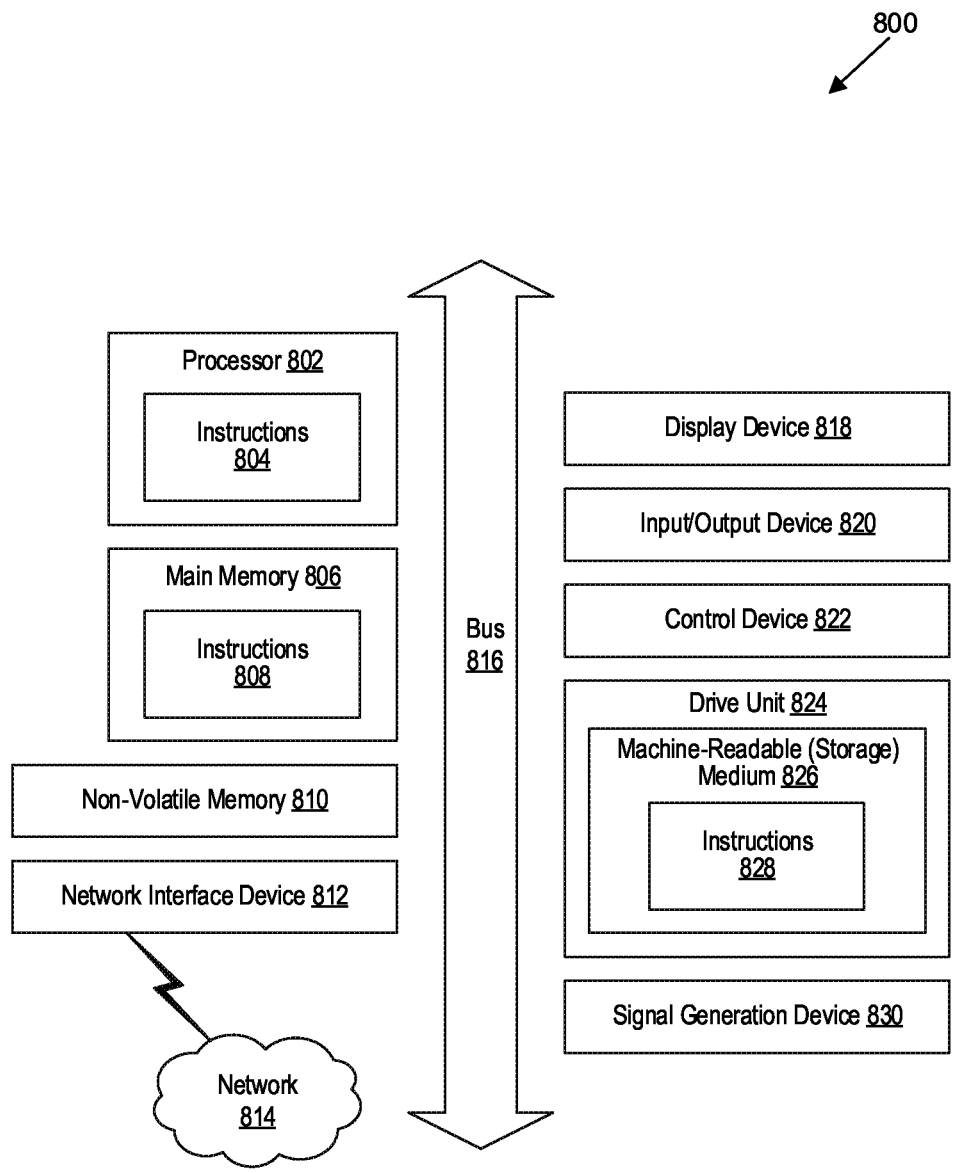
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/ output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The processor 802 can execute instructions described in this application, for example, instructions described in FIG. 7. The main memory 806, the non-volatile memory 810, and/or the drive unit 824 can store the instructions executed by the processor 802, the database 240 in FIG. 2, and/or the data 230 in FIG. 2. The network 814 can enable communication between the data processing units 310, 320, 330, 340, 350 in FIG. 3, and 410, 420, 430, 440, 450, 460 in FIG. 4.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems, or it can include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical discs, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or can include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals, storing instructions to ensure database validity associated with a wireless telecommunication network, which, when executed by at least one data processor of a system, cause the system to:
   obtain a graph including multiple nodes and one or more edges,
      wherein a first node and a second node among the multiple nodes each represent a data-processing block configured to modify or generate data,
      wherein the data relates to wireless-capable devices operating on the wireless telecommunication network,
      wherein the first node includes a first data input and a first data output,
      wherein the second node includes a second data input and a second data output, and
      wherein an edge represents a flow of data between the first node and the second node;
   obtain multiple controls associated with the graph,
      wherein a first control among the multiple controls is associated with the first data output,
      wherein a second control among the multiple controls is associated with the second data input,
      wherein the first control verifies validity of the first data output, and
      wherein the second control verifies the validity of the second data input;
   obtain data to be processed by the first node;
   generate output data in response to processing the data through the first node;
   execute the first control based on the generated output data wherein the execution of the first control is configured to cause:
      determining whether the generated output data is valid according to the first control,
      upon determining that the generated output data is valid according to the first control, sending the generated output data to the second node, and,
      upon determining that the generated output data is not valid according to the first control, generating an alert indicating a problem with the generated output data validity and causing an investigation into a cause of the problem with the generated output data validity.

2. The computer-readable storage medium of claim 1, further comprising the instructions to:
   obtain a threshold associated with the first control,
      wherein the first control includes an expected value associated with the output data;
   determine whether a value associated with the output data meets the expected value within the threshold; and
   upon determining that the value associated with the output data does not meet the expected value within the threshold, generate the alert.

3. The computer-readable storage medium of claim 1, further comprising the instructions to:
   obtain a frequency at which to test the database validity;
   based on the obtained frequency, obtain data associated with a node among the multiple nodes;
   based on the data, execute at least a portion of the graph containing the node by executing a control associated with the node and the data to detect whether the data is valid; and
   upon determining that the data is not valid, generate a second alert indicating a problem with the data validity.

4. The computer-readable storage medium of claim 1, further comprising the instructions to:
   create a user interface configured to receive an indication of the graph, an indication of a mode of communication between the first node and the second node, and a frequency at which to test the database validity; and
   based on the indication of the graph, the indication of the mode of communication, and the frequency, automatically create the multiple controls associated with the graph and a frequency at which to test a portion of the graph.

5. The computer-readable storage medium of claim 1, further comprising the instructions to:
  obtain a user profile and multiple graphs corresponding to multiple user profiles;
  based on the user profile and the multiple user profiles, determine a first graph among the multiple graphs matching the user profile; and
  assign the first graph to the user profile.

6. The computer-readable storage medium of claim 1, the instructions to generate the alert further comprising the instructions to:
  obtain from a second database multiple alerts and multiple solutions associated with the multiple alerts;
  match the alert to an alert contained in the second database;
  based on the match, retrieve a solution associated with the alert contained in the second database; and
  suggest the solution to resolve the alert.

7. A system comprising:
  at least one non-transitory memory storing instructions;
  at least one hardware processor configured to execute the instructions that cause the processor to obtain a data structure representing multiple data-processing blocks and a data flow among the multiple data-processing blocks;
  a first data-processing block among the multiple data-processing blocks including a first data input and a first data output, the first data processing block configured to obtain the first data input and process the data to obtain the first data output;
  a second data-processing block among the multiple data-processing blocks including a second data input and a second data output;
  a first control among multiple controls associated with the data structure,
    wherein the first control is associated with the first data output and is configured to:
    verify validity of the first data output;
    based on the execution of the first control, determine whether the first data output is valid according to the first control;
    upon determining that the first data output is not valid according to the first control, generate an alert indicating a problem with the first data output validity; and
    upon determining that the first data output is valid according to the first control, send the first data output to the second data-processing block.

8. The system of claim 7, wherein the data structure comprises a graph, wherein the graph includes multiple nodes and one or more edges, and wherein an edge represents a flow of data between the first data-processing block and the second data-processing block.

9. The system of claim 7, further comprising a second control among the multiple controls configured to:
  obtain a frequency at which to test a database validity;
  based on the obtained frequency, obtain data associated with a data-processing block among the multiple data-processing blocks;
  based on the data, verify validity of the data; and
  upon determining that the data is not valid, generate a second alert indicating a problem with the data validity.

10. The system of claim 7, further comprising the first control configured to:
  obtain a threshold associated with the first control, wherein the first control includes an expected value associated with the output data;
  determine whether a value associated with the output data meets the expected value within the threshold; and
  upon determining that the value associated with the output data does not meet the expected value within the threshold, generate the alert.

11. The system of claim 7, further comprising the at least one hardware processor configured to:
  create a user interface configured to receive an indication of the data structure, an indication of a mode of communication between the first data-processing block and the second data-processing block, and a frequency at which to test database validity; and
  based on the indication of the data structure, the indication of the mode of communication, and the frequency, automatically create the multiple controls associated with the data structure and a frequency at which to test a portion of the data structure.

12. The system of claim 7, further comprising the at least one hardware processor configured to:
  obtain a user profile, and multiple data structures corresponding to multiple user profiles;
  based on the user profile and the multiple user profiles, determine a first data structure among the multiple data structures matching the user profile; and
  assign the first data structure to the user profile.

13. The system of claim 7, wherein the first control configured to generate the alert further comprises the first control configured to:
  obtain from a second database multiple alerts and multiple solutions associated with the multiple alerts;
  match the alert to an alert contained in the second database;
  based on the match, retrieve a solution associated with the alert contained in the second database; and
  suggest the solution to resolve the alert.

14. A method comprising:
  obtaining a representation of multiple data-processing blocks and data flow among the multiple data-processing blocks,
    wherein a first data-processing block among the multiple data-processing blocks includes a first data input and a first data output, and a second data-processing block among the multiple data-processing blocks includes a second data input and a second data output;
  obtaining a first control associated with the first data output,
    wherein the first control verifies validity of the first data output; and
  obtaining a second control associated with the second data output,
    wherein the second control verifies the validity of the second data input;
  obtaining data to be processed by the first data-processing block;
  obtaining output data in response to processing the data through the first data-processing block;
  executing the first control based on the output data wherein the execution of the first control is configured to cause:
    determining whether the output data is valid according to the first control,
    upon determining that the output data is valid according to the first control, sending the output data to the second data-processing block, and, upon determining that the output data is not valid according to the first control, generating an alert indicating a problem with the output data validity.

15. The method of claim 14, wherein the representation comprises a graph, wherein the graph includes multiple nodes and one or more edges, and wherein an edge represents a flow of data between the first data-processing block and the second data-processing block.

16. The method of claim 14, comprising:
obtaining a frequency at which to test database validity;
based on the obtained frequency, obtaining data associated with a data-processing block among the multiple data-processing blocks;
based on the data, executing at least a portion of the representation containing the data-processing block by executing a control associated with the data-processing block and the data to detect whether the data is valid; and
upon determining that the data is not valid, generating a second alert indicating a problem with the data validity.

17. The method of claim 14, comprising:
obtaining a threshold associated with the first control, wherein the first control includes an expected value associated with the output data;
determining whether a value associated with the output data meets the expected value within the threshold; and
upon determining that the value associated with the output data does not meet the expected value within the threshold, generating the alert.

18. The method of claim 14, comprising:
creating a user interface configured to receive an indication of the representation, an indication of a mode of communication between the first data-processing block and the second data-processing block, and a frequency at which to test database validity; and
based on the indication of the representation, the indication of the mode of communication, and the frequency, automatically creating the multiple controls associated with the multiple data-processing blocks and a frequency at which to test a portion of the multiple data-processing blocks.

19. The method of claim 14, comprising:
obtaining a user profile and multiple data structures corresponding to multiple user profiles;
based on the user profile and the multiple user profiles, determining a first data structure among the multiple data structures matching the user profile; and
assigning the first data structure to the user profile.

20. The method of claim 14, wherein the generating the alert further comprises:
obtaining from a second database multiple alerts and multiple solutions associated with the multiple alerts;
matching the alert to an alert contained in the second database;
based on the match, retrieving a solution associated with the alert contained in the second database; and
suggesting the solution to resolve the alert.

* * * * *